United States Patent Office 3,434,378
Patented Mar. 25, 1969

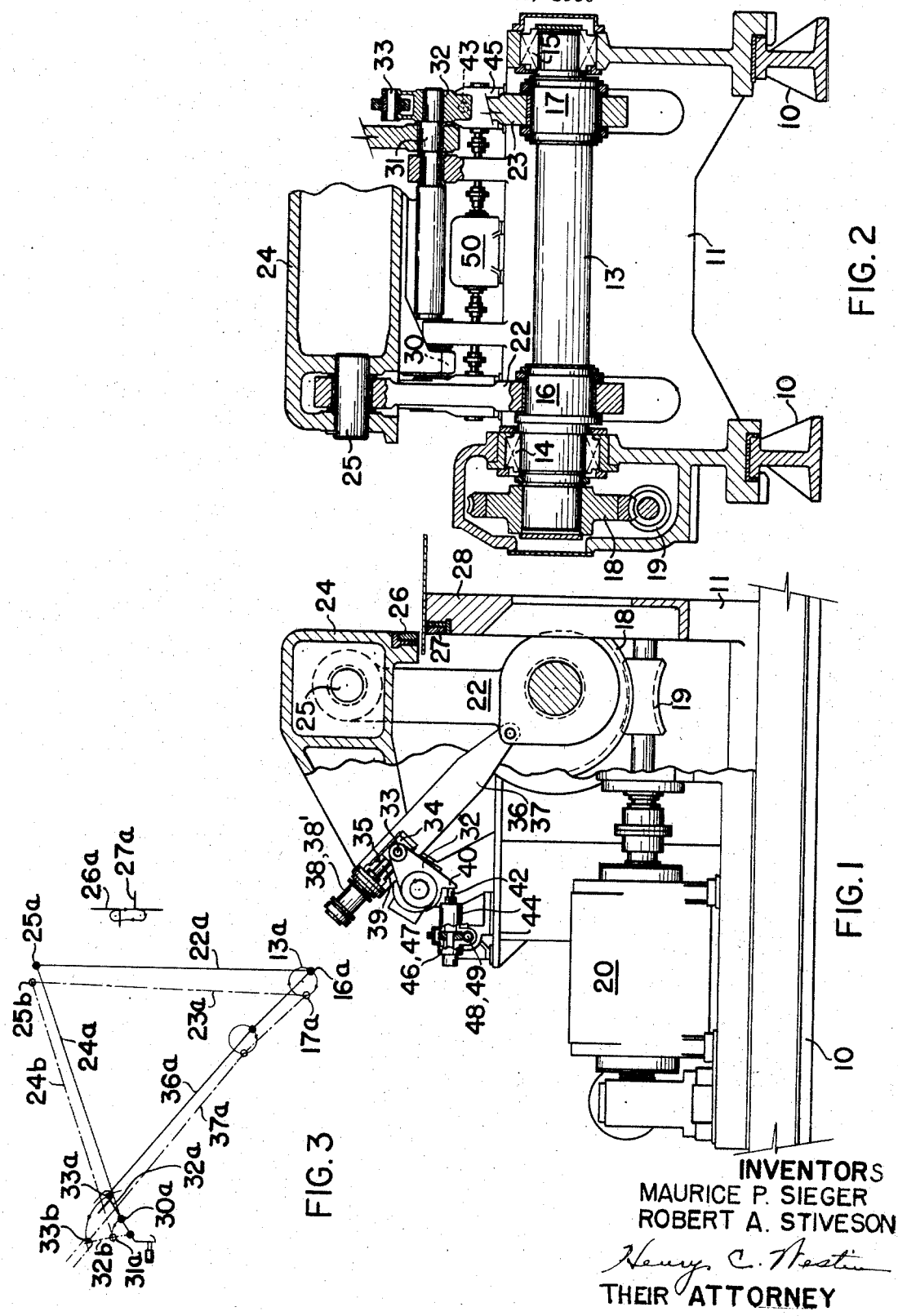

3,434,378
APPARATUS FOR SHEARING PLATE
Maurice Paul Sieger, Upper St. Clair Township, and Robert A. Stiveson, Monroeville, Pa., assignors to United Engineering and Foundry Company, Pittsburgh, Pa., a corporation of Pennsylvania
Filed Oct. 25, 1966, Ser. No. 589,401
Claims priority, application Great Britain, Nov. 8, 1965, 47,328/65
Int. Cl. B26d 5/08
U.S. Cl. 83—556
9 Claims

ABSTRACT OF THE DISCLOSURE

The disclosure of this invention relates to a plate side trimming shear and comprises a shear frame having a stationary and a movable knife. The movable knife is carried by a link mounted on and movable by a first eccentric carried by a drive shaft. Connected to the movable knife is a second eccentric so that rotation of the first eccentric effects a cut and the rotation of the second eccentric displaces the movable knife away from the shearing edge of the plate. A strut extending between and connected to the eccentrics maintains the desired cycle relationship between two eccentrics.

This invention relates to a shear and, more particularly, to a shear adapted to sever the marginal portion of metallic strip, sheet or plates.

It is quite common in the production of metallic products, such as strip, sheet and plates, to trim the marginal edge thereof thereby removing any imperfections that occur at the edge of the material during the manufacture thereof. For thick gauge material, such as strip and plate, it is customary to trim the marginal edges thereof by employing what is referred to in the trade as a side trimming shear. The shear is arranged so that the marginal edges of the material can be fed or passed between its blades in an intermittent fashion wherein a given length of the marginal edge is severed in step-like fashion. Since the operational sequence of the shear is not a continuous one, it requires the repositioning of the strip for each side trimming operation. This, of course, requires a certain amount of lost time resulting in a very slow production rate for the side trimming shear.

In the interest of increasing the productivity, it has been suggested that as soon as the shearing has taken place that the plate be made available to be advanced in preparation for the next shearing sequence. However, in prior shears there was a certain delay that had to be tolerated after completion of the shearing operation and before the material could be advanced. More specifically, it was necessary in the type of shears employed to move the movable knife of the shear to substantially its initial position prior to advancing the plate. This was necessary in view of the fact that in moving the blade to its initial position, the blade had the tendency to engage the trimmed edge of the material and, hence, interfere with the advancement of the plate. In recognition of this problem, it has been suggested to provide some way in which the blade could be displaced relative to the edge of the material soon after the shearing had taken place, thereby allowing the plate to be advanced as soon as possible after the completion of the shearing operation. In this way the plate could be moved to the proper position for the subsequent shearing operation immediately after the cut and during the time the movable blade was being brought to its initial position.

The present invention provides an arrangement which will accomplish the aforesaid objective, and wherein there is provided a shear that can be economically constructed and operated, including a very simple, but very dependable and automatic construction for displacing the movable blade relative to the material.

It is one of the features of the present invention to provide a shear adapted to side trim sheet, strip and plates including a movable knife and a stationary knife, said movable knife being connected to separate first and second eccentrics, means for preventing rotation of the second eccentric when the movable knife is passing through its cutting cycle, said means adapted to permit rotation of said second eccentric while the movable knife is returning to its initial position and during which period said movable knife is displaced relative to the sheared edge of the material so as to provide a clearance between the movable knife and the trimmed edge of the material in which connection the material can be advanced without interference from the movable knife.

In one form the present invention provides in a shear employed, for example for side trimming plates, sheet and the like, a first knife head having a knife, a second knife head having a knife arranged to cooperate with the first knife to effect a cut, a first eccentric connected to said first knife head for moving said first knife towards said second knife to effect a cut, said first knife head also connected to a second eccentric, means for moving said second eccentric in time relation with the first eccentric so that said movable knife is held during a first phase of its movement in a predetermined position represented by a given clearance between said two knives and during a second phase said movable knife is displaced, whereby said clearance is increased and means for repositioning the movable knife in said predetermined position during said second phase of movement.

These features, as well as other features of the present invention, will be more readily understood when the following description is read along with the accompanying drawing of which:

FIGURE 1 is an elevational view, partly in section, of a side trimming plate shear incorporated in the features of the present invention, FIGURE 2 is an elevational view, partly in section, of the shear illustrated in FIGURE 1, and FIGURE 3 is a line diagram of the principal components of the shear illustrated in FIGURES 1 and 2.

With reference to FIGURES 1 and 2 there is shown a shear base 10 to which there is secured a shear housing 11, the housing adapted, as illustrated in FIGURE 2, to receive a shaft 13 which it rotatably supports in bearings 14 and 15. Still referring to FIGURE 2, the shaft 13 has formed two spaced apart main eccentrics 16 and 17. Outward of the bearing 14 the shaft carries a gear wheel 18 which meshes with a worm 19 driven by a motor 20 through which means the shaft 13 is rotated along with the eccentrics 16 and 17.

To the main eccentrics 16 and 17 there are connected links 22 and 23 which extend in a vertical upward direction and are connected to a top knife head 24 by pins 25. The knife head 24 carries a raked knife 26 which cooperates with a similar raked knife 27 mounted and secured to an upright 28 which forms part of the housing 11. The knife 27 is stationary, whereas the knife 26 is movable in a vertical direction towards and away from the stationary knife 27.

The knife head 24 extends towards the left of the shear, as one views FIGURE 1, and at its extreme end it is connected to a pair of identical spaced-apart eccentrics 30 and 31 rotatably received in the housing 11. To each eccentric 30 and 31 there is secured a bell crank 32 which at its other end receives a pin 33, the pin being secured to a block 34. The blocks 34 have opposed guiding surfaces that slide in openings 35 formed in a pair of struts 36 and 37. As noted in FIGURE 1, the struts at their lower ends are connected to one of the links 22 and 23 and at their upper ends carry accumulators 38 and 38'. These accumulators take the form of piston cylinder assemblies in which the piston rods 39 engage the upper surfaces of the slidable blocks 34. The bell cranks 32 are formed with projections 40 which are engaged by the ends of screws 42 and 43, the screws being rotatably received in housings 44 and 45 and engaged by worm wheels 46 and 47 that are driven by worms 48 and 49 which, in turn, are driven by motors 50, one of which is shown only in FIGURE 2.

As previously noted, the screws are employed to initially set the required gap between the movable knife 26 and the stationary knife 27. It will be appreciated that, according to well-known practice, the gap between the opposed cutting surfaces of the two knives will be changed as the thickness of the plate changes to obtain the optimum pressure condition with respect to the capacity of the shear.

The present invention provides a novel mechanism for automatically controlling the positioning of the movable knife 26 so that in one phase of its movement it is placed and maintained in the proper cutting relationship with respect to the plate and the lower knife 27, and immediately after the cut has been accomplished, the movable knife is displaced away from the sheared edge of the plate a distance sufficient to allow the movable knife 26 to be moved to its starting position, while at the same time the plate can be advanced and positioned for the next shearing operation. The manner in which this control movement is obtained is the subject matter of this invention.

As noted from the above description, the essential element of the above-described shear is the construction of the struts 36 and 37 and their relationship to the secondary eccentrics 30 and 31. As noted, the horizontal displacement of the knife 26 is controlled by the eccentrics 30 and 31. Hence, by holding the eccentrics against rotation by virtue of the screws 42 and 43 being in engagement with the bell cranks 32, the movable knife 26 is maintained in its proper cutting position and substantially perpendicular to the plate to be side trimmed. Once the main eccentrics 16 and 17 have passed through their cutting phase, the struts 36 and 37 are caused to move towards the eccentrics 30 and 31 which results in a displacement of the bell cranks by virtue of the struts engaging the sliding blocks 34 causing a prescribed degree of rotation of the secondary eccentrics 30 and 31 to displace the knife head 24 and, hence, the movable knife 26.

In this arrangement it can be seen that the struts 36 and 37 are free to move in one direction away from the eccentrics 30 and 31 on the rotation of the main eccentrics 16 and 17 and do not effect a displacement of the bell cranks 32. However, when the struts are moved in the opposite direction, i.e., in a direction towards the eccentrics 30 and 31, the struts are caused to engage the blocks 34 and against the pressure of the accumulators 38 and 38', displace the bell cranks and, hence, the eccentrics 30 and 31. As the main eccentrics 16 and 17 reach the high point to position the movable knife 26 in its initial starting position, the accumulators 38 and 38' urge the blocks 34 and bell cranks 32 into engagement with the screws 42 and 43 to reposition the upper knife 26 in the proper cutting position. This action is shown in a line diagram in FIGURE 3 where the parts illustrated are represented with the lowercase letter (a, b, etc.) in order to readily identify them in relationship to the form they take in FIGURES 1 and 2.

While one specific mechanism has been illustrated for the purpose of describing the invention, it will be appreciated that in place of the struts 36 and 37 other mechanisms having the capability of establishing a timed relationship between the two eccentrics can be employed. One example of this would be a set of eccentric gearing; another, would be a linkage system.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:
1. In a shear for severing elongated material, such as, strip and plate,
   a shear housing,
   a first knife carried by said housing,
   a movable knife head to which is secured a second knife and arranged to cooperate with said first knife to effect a cut,
   means for supporting said movable knife head to maintain the movable knife in a proper position for effecting a cut,
   a first eccentric rotatably carried by said housing and connectable to said movable knife head for moving said second knife towards and away from the material,
   a second eccentric discrete from said first eccentric connected to said movable knife head effective during each cutting cycle to displace the second knife out of said cutting position and in a direction away from the sheared edge of the material, and
   means for controlling the movement of said second eccentric in time relationship to the movement of said first eccentric.
2. In a shear according to claim 1, wherein said first eccentric is arranged on the side of the shear common to the first knife and opposite to the movable knife,
   a link connecting said first eccentric to said movable knife head,
   a strut connected to and extending between said first and second eccentrics, constructed and arranged to cause rotation of said second eccentric only on the return stroke of said first eccentric.
3. In a shear according to claim 1, wherein said second eccentric is carried by said means for supporting said movable knife head,
   said support means comprising a shaft adapted to pivotally carry said movable knife head.
4. In a shear according to claim 2, including a bell crank connected to said second eccentric and adapted to be displaceable by said strut on the return stroke of said first eccentric,
   means for holding the bell crank from moving during the cutting stroke of said first eccentric and allowing movement thereof on the return stroke of said first eccentric.
5. In a shear according to claim 4, wherein said means for holding said bell crank against movement includes a screw,
   means for rotating said screw so as to limit the extent of movement of said bell crank in said one direction.
6. In a shear according to claim 4, including
   an opening in said strut,
   a slidable block received in said opening,
   means for connecting said block to said bell crank,
   resilient means engageable with said block in a manner to urge the bell crank against said screw.
7. In a shear according to claim 6, wherein said opening in said strut is constructed to allow said strut to move both during the cutting stroke of said first eccentric during which period no movement of said bell crank will be effected and during the return stroke, during which period movement of the bell crank will be effected.
8. In a shear according to claim 1,
   a first shaft rotatably supported in said housing,
   said first eccentric comprises two eccentrics carried by said first shaft, means for rotating said first shaft, a pair of links having their lower ends carried by said pair of first eccentrics and their upper ends connected to said movable knife head, said means for supporting said movable knife head, including an arm extending in a direction away from the first and second knives and a second shaft rotatably supported by said housing, said second eccentric comprising two eccentrics carried by said second shaft, said second eccentric adapted to carry said arm, said strut comprising a pair of struts, each of which are connected to and extend between one of said first and second eccentrics, the relationship of said eccentrics to each other and the connecting points of said struts relative to their associated eccentrics being such that on the downward stroke of said first eccentrics, said struts move in a direction so as not to effect movement of said second eccentrics and on the upward stroke of said first eccentrics the struts are caused to move in a direction to cause movement of said second eccentrics.

9. In a shear according to claim 1, wherein the strut is connected to the adjacent side of the first eccentric and said second eccentric is arranged so that on rotation thereof by said strut said movable head is moved in the direction of movement of said strut.

References Cited

UNITED STATES PATENTS

| | | | |
|---|---|---|---|
| 1,878,121 | 9/1932 | Edwards | 83—317 |
| 3,154,988 | 11/1964 | Greis | 83—558 X |
| 3,202,029 | 8/1965 | Morath | 83—317 X |
| 3,246,552 | 4/1966 | Sieger | 83—556 X |

JAMES M. MEISTER, *Primary Examiner.*